United States Patent [19]
Webb et al.

[11] Patent Number: 5,825,414
[45] Date of Patent: Oct. 20, 1998

[54] METHOD AND APPARATUS FOR MAKING CORRECTIONS IN A VIDEO MONITOR DURING HORIZONTAL SCAN

[75] Inventors: James R. Webb; Steven J. Lassman, both of Boulder; Ron C. Simpson, Erie, all of Colo.

[73] Assignee: Display Laboratories, Inc., Boulder, Colo.

[21] Appl. No.: 585,926

[22] Filed: Jan. 16, 1996

Related U.S. Application Data

[63] Continuation of Ser. No. 258,393, Jun. 13, 1994, Pat. No. 5,504,521.

[51] Int. Cl.$^6$ .......................... H04N 17/00; H04N 17/02
[52] U.S. Cl. .......................... 348/180; 348/190; 348/177
[58] Field of Search ................................. 348/180, 190, 348/178, 263, 184, 95, 189, 87, 656, 92, 657, 460, 185, 186, 177, 678, 691; H04N 17/00, 17/02, 9/73

[56] References Cited

U.S. PATENT DOCUMENTS

| 4,021,745 | 5/1977 | Suzuki et al. ............................ 330/10 |
| 4,058,826 | 11/1977 | Schneider . |
| 4,275,354 | 6/1981 | Suemutsu et al. ...................... 327/176 |
| 4,506,292 | 3/1985 | Newton et al. . |
| 4,654,706 | 3/1987 | Davidson . |
| 4,672,275 | 6/1987 | Ando . |
| 4,757,239 | 7/1988 | Starkey, IV . |
| 4,772,948 | 9/1988 | Irvin . |
| 4,816,908 | 3/1989 | Colineau et al. . |
| 4,897,721 | 1/1990 | Young . |
| 4,952,851 | 8/1990 | Macaulay . |
| 5,020,116 | 5/1991 | McCauley . |
| 5,059,979 | 10/1991 | Micic et al. . |
| 5,081,523 | 1/1992 | Frazier . |
| 5,216,504 | 6/1993 | Webb et al. . |
| 5,276,458 | 1/1994 | Sawdon . |
| 5,276,632 | 1/1994 | Corwin et al. . |
| 5,426,519 | 6/1995 | Banton . |
| 5,432,548 | 7/1995 | Byen . |
| 5,440,340 | 8/1995 | Tsurutani . |
| 5,504,521 | 4/1996 | Webb et al. ............................ 348/180 |
| 5,596,249 | 1/1997 | Ochiai .................................... 315/371 |

FOREIGN PATENT DOCUMENTS

| 1-204594 | 8/1989 | Japan . |
| 1-204595 | 8/1989 | Japan . |
| 3-99376 | 4/1991 | Japan . |

OTHER PUBLICATIONS

Society for Information Display, Digest of Technical Papers, vol. XXV, May 1994.
Kern, G.A., "CRT Display Inspection with A Solid State Camera—3D Modelling & Parallax Correction," Jun. 1994.
*SGS–Thomson "STV9420/21 Mulitsync on Screen Display for Monitor" Oct. 1993, Carrollton, Texas.
*Suckle, L.I., "Automatic Alignment Techniques for Color TV Manufacturing," IEEE, Jun. 1988, Rosemont, IL.

Primary Examiner—Michael Lee
Attorney, Agent, or Firm—William W. Cochran, II; Holland & Hart LLP

[57] ABSTRACT

A circuit within a video monitor for making corrections during horizontal scan includes a data storage device containing information relating to a selected display parameter, an integrator receptive of the stored information and adapted to produce an integrated signal therefrom, and an amplifier receptive of the integrated signal for supplying signals to the video monitor based on the integrated signal. The information supplied from the data storage device to the integrator is encoded in a pulse density modulated wave form via a tri-state gate and a one-shot timer. The information stored in the data storage device is stored in bytes, each byte containing a "sign bit" and a plurality of data bits.

17 Claims, 6 Drawing Sheets

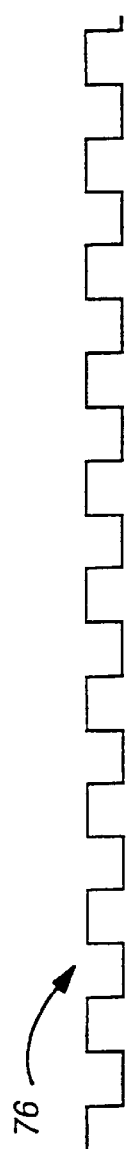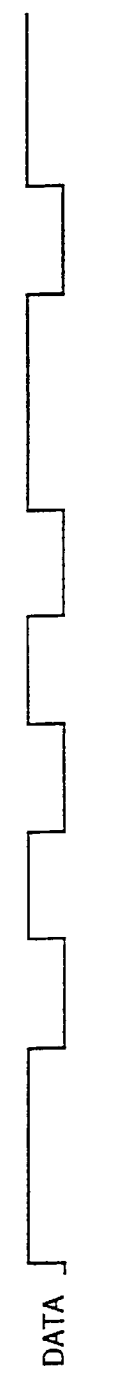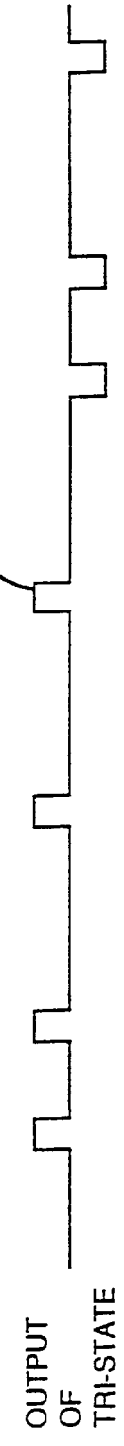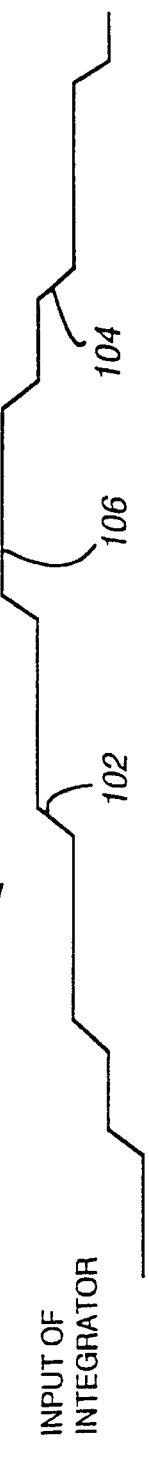
*Fig. 4A* OSC
*Fig. 4B* DATA
*Fig. 4C* OUTPUT OF ONE-SHOT
*Fig. 4D* "SIGN" INPUT TO TRI-STATE
*Fig. 4E* OUTPUT OF TRI-STATE
*Fig. 4F* INPUT OF INTEGRATOR

Fig. 5A  OSC
Fig. 5B  DATA
Fig. 5C  OUTPOT OF ONE-SHOT
Fig. 5D  "SIGN" INPUT TO TRI-STATE
Fig. 5E  OUTPUT OF TRI-STATE
Fig. 5F  INPUT OF INTEGRATOR

METHOD AND APPARATUS FOR MAKING CORRECTIONS IN A VIDEO MONITOR DURING HORIZONTAL SCAN

This is a continuation of application Ser. No. 08/258,393 filed on Jun. 13, 1994, now U.S. Pat. No. 5,504,521.

This invention relates generally to video monitors and automatic alignment systems for video monitors, particularly automatic alignment systems including circuits for adjusting or correcting predetermined characteristics of the monitor's displayed image during the horizontal scan of the monitor.

BACKGROUND OF THE INVENTION

Video monitors, such as for use with digital computers, typically include a cathode ray tube (CRT) and driver circuitry including video, horizontal and vertical amplifiers. Early versions of video monitors included a variety of potentiometers which were adjusted at the factory to align and adjust the display presented on the CRT. Also, a few pots were accessible on the exterior of the monitor for adjustment by the user. The external pots commonly included controls for brightness, contrast and possibly horizontal and vertical size and center position.

More modern monitors often include a relatively larger number of adjustable parameters which can be used to provide a more precisely-aligned and color-balanced display. Some of the modern monitors include digital control circuits for storing values of these adjustable parameters and for controlling the driver circuitry of the monitor in accordance with the stored values.

U.S. Pat. No. 5,216,504 for "Automatic Precision Video Monitor Alignment System" owned by the assignee of the present application, discloses an alignment system including a pick-up camera located adjacent to the CRT of a monitor for capturing an image of the display and communicating the image to a computer. The computer communicates with a microprocessor and digital control circuit within the monitor which control the video driver circuit of the monitor. The system operates to automatically and optimally adjust the alignment and color balance of the display for the particular video signal which is applied to the monitor and for the particular settings of the external controls on the monitor.

In order to most accurately adjust the alignment and color balance of the display, it is desirable to make variable adjustments during the vertical and horizontal scan of the CRT by the driver circuitry. Products manufactured and used under license of the assignee include the capability to make variable adjustments during the vertical scan of the CRT by the driver circuitry. This is accomplished by a voltage wave form generator which develops a pulse width modulated (PWM) signal for each display parameter to be controlled. As disclosed in U.S. Pat. No. 5,216,504 the width of the PWM signal corresponds to the magnitude of the target value for the display parameter. The pulse width can be varied during the vertical scan to give the desired target value. Rather than provide a separate PWM signal for each horizontal line in the vertical scan, the lines are grouped into a smaller number of segments. A separate PWM signal is provided for each segment, with each signal representing the rate of change of the display parameter during the given segment. This rate of change is integrated once to form a smooth correction.

Unfortunately, no such correction is available for variable adjustment during the horizontal scan of the CRT due to the much higher horizontal scan frequency versus the vertical scan frequency.

It is against the background, and the limitations and problems associated therewith, that the present invention has been developed.

SUMMARY OF THE INVENTION

The apparatus of the present invention for making corrections in a video monitor during horizontal scan includes a data storage device containing information relating to a target value for a selective parameter relating to one of a plurality of display characteristics of the video monitor. The circuit also includes an integrator receptive of the stored information and adapted for producing an integrated signal which is supplied to an amplifier which in turn supplies a signal based on the integrated signal to the monitor.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

FIGS. 4A, 4B, 4C, 4D, 4E and 4F are voltage wave forms of signals in the circuit shown schematically in FIGS. 2 and 3.

FIGS. 5A, 5B, 5C, 5D, 5E and 5F are voltage wave forms of signals in the circuit shown schematically in FIGS. 2 and 3, shown with a different oscillator frequency than in FIGS. 4A–4F.

DESCRIPTION OF THE PREFERRED EMBODIMENT

Figure 1:
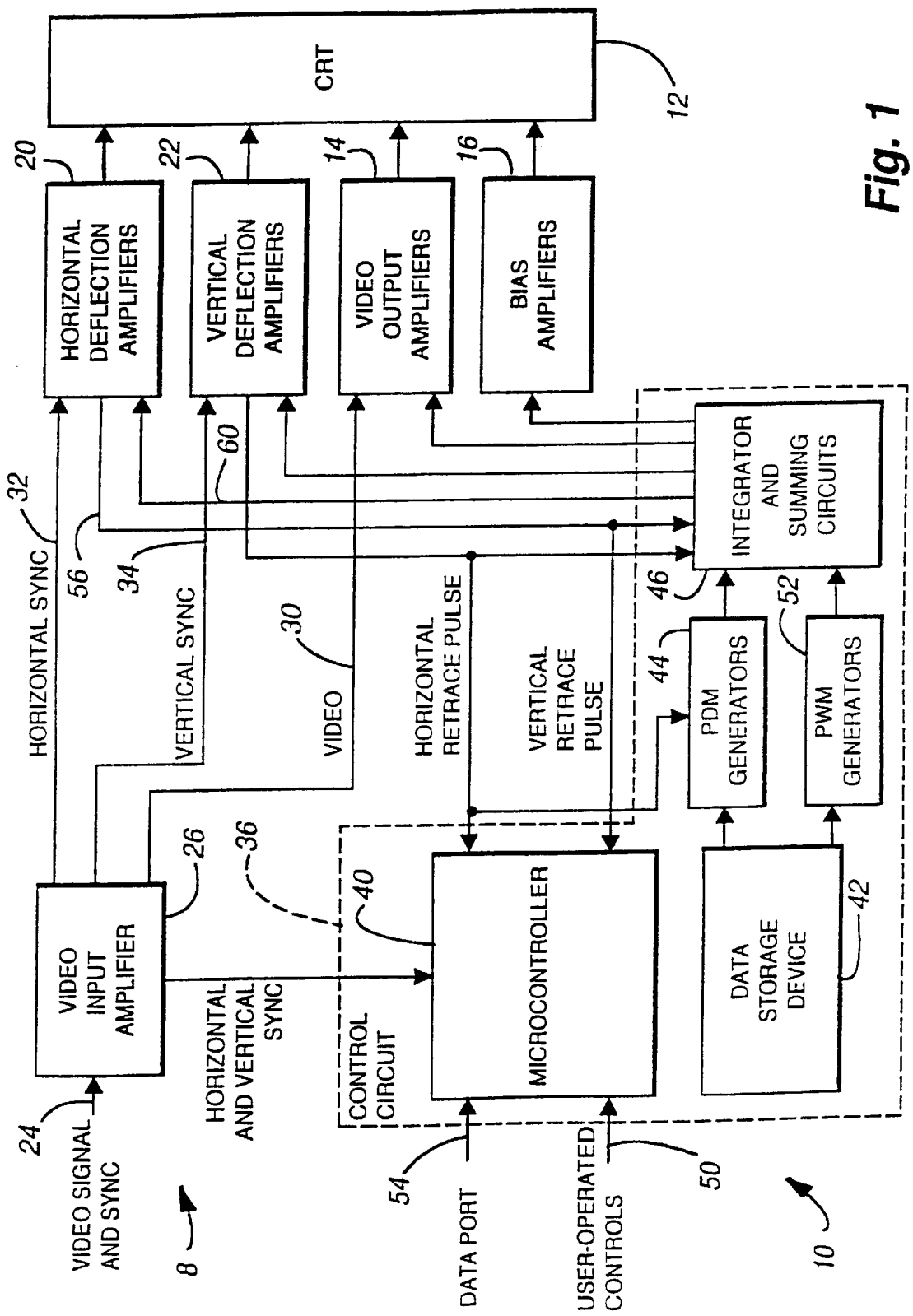
FIG. 1 is a block diagram of the system of the present invention for making corrections in a video monitor during horizontal scan of the CRT.

A technique for implementing adjustments to selected display parameters during horizontal scan of a video monitor 8 is implemented in a system 10 for controlling amplifiers for a CRT 12 of the monitor, as shown in FIG. 1. The amplifiers include video amplifiers 14, bias amplifiers 16, horizontal deflection amplifiers 20 and vertical deflection amplifiers 22. A video signal 24 and associated sync signal are received by a video input amplifier 26 and divided into video 30, horizontal sync 32 and vertical sync 34 signals for the amplifiers. A control circuit 36 also supplies inputs to the amplifiers. The control circuit 36 includes a microcontroller 40 for receiving data and storing selected portions of the data in a data storage device 42. The data may be accessed from the device 42 by a pulse density modulation (PDM) generator 44 for generating a series of pulses which are received by an integrator and summing circuit 46 in order to modify one of the inputs into the video, bias, vertical or horizontal amplifiers. This modification is made during the horizontal scan of the CRT. The integrator and summing circuit receives "static" signals 50 from user-operated controls such as brightness, contrast, etc. and also receives signals relating to adjustments or modifications to be made during the vertical scan via the microcontroller 40, the data storage device 42, and a pulse width modulation (PWM) generator 52.

The microcontroller 40, for example, a Motorola 68HC11, handles communications between the control circuit 36 and devices external to the monitor 8. These communications are provided through a data port 54 of the microcontroller 40 using standard RS-232 protocol. All adjustments to the control circuit 36 in the monitor 8, as well as queries about current monitor states are made over this port 54. In addition, the microcontroller 40 receives the signals 50 from user-operated controls such as brightness, contrast, etc. The microcontroller also receives the horizontal and vertical sync signals 32 and 34 from the video input amplifier 26 and horizontal and vertical retrace pulses 56 and 60 from the horizontal and vertical deflection amplifiers 20 and 22, respectively.

Figure 2:
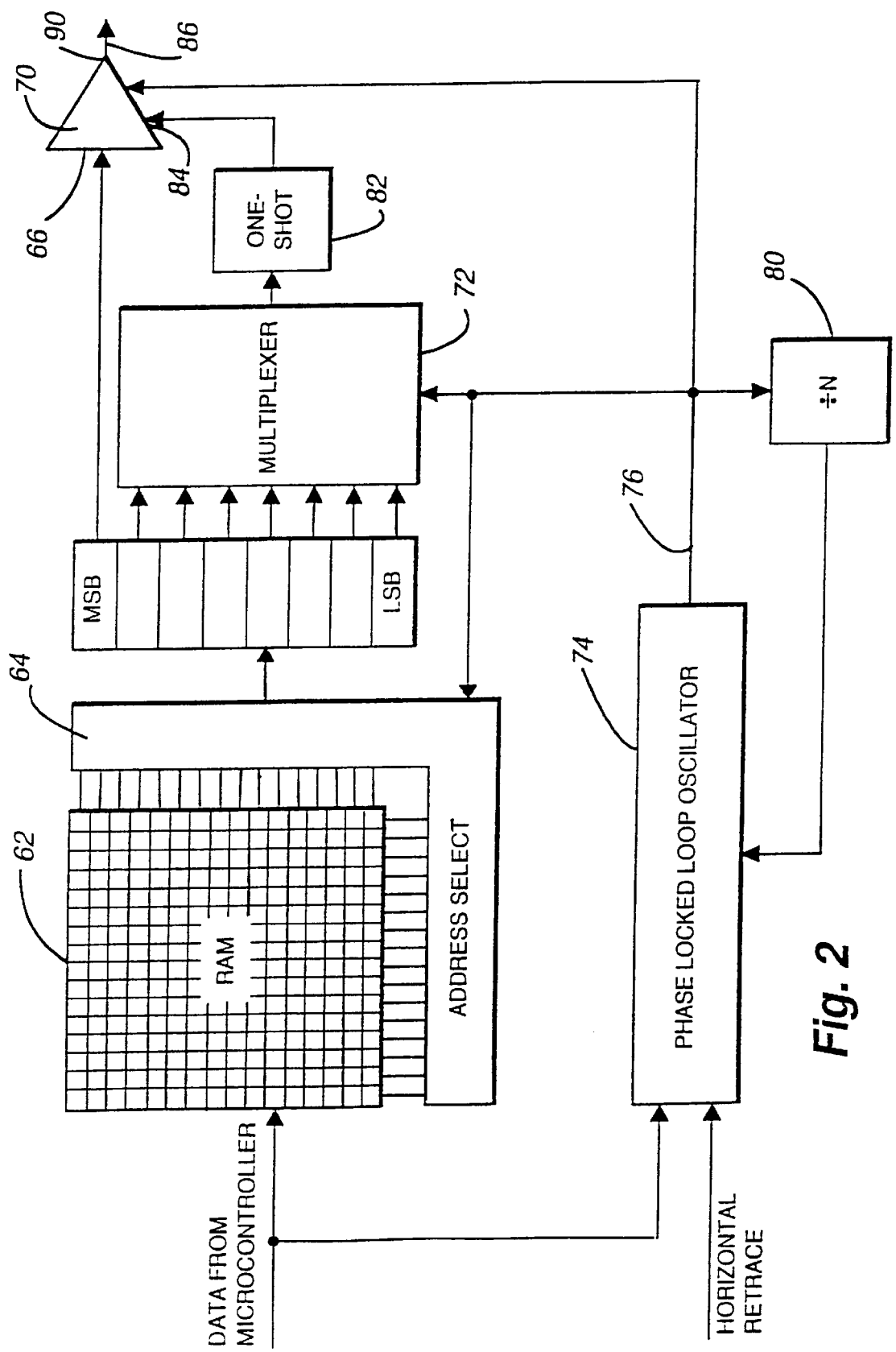
FIG. 2 is a schematic of the pulse density modulation generator and data storage device shown in FIG. 1.

The data storage device 42 may be any of several types of data storage devices, for example random access memory (RAM), as shown in FIG. 2. The RAM is arranged in an array having one or more dimensions. Described below is a two-dimensional array 62 which corresponds to a two-dimensional view of the image displayed by the monitor 8. Thus, RAM locations along the top row of the array contain information relating to the image displayed along the top edge of the monitor. Similarly, RAM locations along the vertical, left-hand column of the array contain information relating to the image displayed along the left-hand edge of the monitor. The array 62 of RAM preferably has sixteen columns and between sixteen and thirty-two rows. Each of the rows correspond to a group of raster scan lines in the image. Thus, with a 256-line image and sixteen rows, each row corresponds to a group of sixteen lines.

The RAM location in the first row, first column of the array contains one 8-bit byte of information as do each of the other RAM locations. Each byte of information contains data relating to a segment of pixels along the horizontal lines. The most significant bit (MSB) of the byte is analogous to a direction or "sign" bit or flag denoting a positive or negative slope to be encoded. The remaining seven bits of the byte are called data bits and are analogous to seven sequential pieces of "amplitude" information.

An address select circuit 64 associated with the RAM 42 is controlled to automatically sequence through each column of a particular row during the horizontal scan of the monitor 8 for the scan lines corresponding to the first group. As each byte is selected, the MSB is provided to an input terminal 66 of a tri-state gate 70, for example a Motorola MC74-125 or 126. The seven data bits are supplied to a multiplexer 72. The multiplexer 72 is clocked by a phase-locked loop oscillator 74 operating at an oscillation frequency equal to the horizontal rate multiplied by the number of columns or bytes multiplied by seven data bits in each byte. This frequency may preferably be in the range of twenty to thirty megahertz or greater.

An output signal 76 (FIG. 4A) from the oscillator 74 is also used to clock the address select circuit 64 and to trigger the tri-state gate 70. The oscillator receives commands from the microcontroller 40 as well as the horizontal retrace pulse 56 from the horizontal deflection amplifiers 20. The horizontal retrace pulse 56 is used as a reference for the oscillator 74. A divide-by-N counter 80 receives the output signal 76 from the oscillator 74 and provides the feedback signal to the oscillator for comparison to the reference.

As the multiplexer 72 is clocked, the least significant bit followed by the second least significant bit followed by the third least significant bit, and so forth, are supplied at the output of the multiplexer, ending with the second most significant bit (FIG. 4B). The output of the multiplexer is provided to a one-shot timer 82 whose output is provided to an enable terminal 84 of the tri-state gate. The one-shot timer 82, for example a Motorola SN74-221, provides a pulse of fixed time (FIG. 4C) duration to the tri-state gate 70. The one-shot timer 82 serves to maintain a given pulse width out of the pulse density modulation (PDM) generator 44 despite variations or changes in the horizontal scan rate. Thus, even if the horizontal rate of a given video signal varies from the horizontal rate of another video signal, the width of the pulse supplied to the enable terminal 84 of the tri-state gate 70 will not vary (FIGS. 4 and 5). This is illustrated in FIG. 5 where the clock frequency is one-half the clock frequency in FIG. 4, yet the width of the one-shot pulse is the same.

As can be seen in FIG. 4E, a pulse density modulated (PDM) signal 86 at an output terminal 90 of the tri-state gate 70 will be at one of three levels. The data bit (FIG. 4B) determines whether the corresponding PDM signal 86 will be at an intermediate 92 or a non-intermediate level. If the PDM signal 86 is to be at a non-intermediate level, the most significant ("sign") bit of each byte (FIG. 4D) determines whether the signal will be at a high 94 or low 96 level.

The PDM signal 86 (FIG. 4E) is integrated by the integrator and summing circuit 46 to provide a horizontal wave form 100 (FIG. 4F) corresponding to the information stored in RAM 42. An example of this wave form 100 may be seen in FIG. 4F corresponding to the PDM signal 86 shown at FIG. 4E. It can be seen that the integrated wave form 100 has three slopes, a positive slope 102, a negative slope 104, and a zero slope 106. However, since the seven data bits in each byte are constrained to be of the same sign or direction, a change of direction (or a transition from positive to negative slope or vice versa) can only occur between each of the bytes. With sixteen bytes there will thus be fifteen inflection points in the integrated wave form 100.

Figure 3:
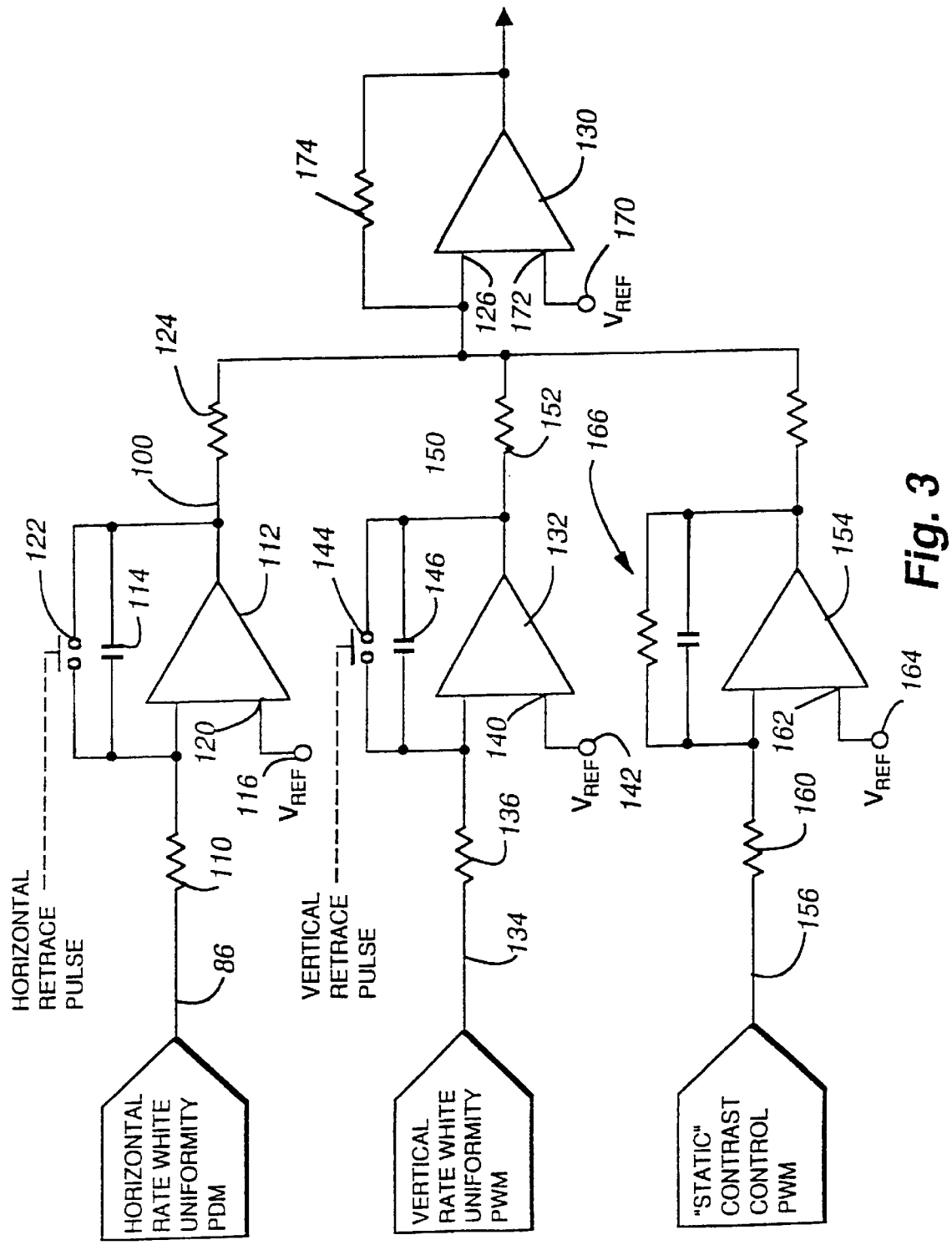
FIG. 3 is a schematic diagram of the integrator and summing circuit of the present invention shown in FIG. 1.

The relationship of the PDM signal 86 and integrated wave form 100 to the control of a particular display parameter can be seen in FIGS. 3 and 4. In this case, the display parameter shown is white uniformity and its effect on the display characteristic of contrast. However, similar examples could be given for horizontal convergence, vertical convergence and horizontal focus.

The horizontal-rate white uniformity (PDM) signal 86 from the tri-state gate 70 is supplied through a resistor 110 (FIG. 3) to a first integrating amplifier 112 having a capacitor 114 in its feedback path. The amplifier 112 has a voltage reference 116 supplied to a second input terminal 120. The amplifier 112 has a discharge switch 122 in parallel with the capacitor 114 to reset the value of the capacitor during each horizontal retrace pulse. Thus, the integration is only performed by this amplifier 112 during each horizontal scan line and then integration begins over again after each horizontal retrace pulse. The output of the first or horizontal integrating amplifier, the integrated wave form 100 discussed above, is supplied through a resistor 124 to a summing input terminal 126 of a summing amplifier 130.

A second integrating amplifier 132 receives a vertical-rate white uniformity pulse width modulated (PWM) signal 134 of the type described in more detail in U.S. Pat. No. 5,216,504, incorporated herein by reference. The vertical-rate white uniformity (PWM) signal 134 is supplied through a resistor 136 to the second integrating amplifier 132. A second input terminal 140 of the second amplifier 132 is connected to a voltage reference 142. A discharge switch 144 is connected in parallel with a capacitor 146 in the feedback path of the second integrating amplifier 132. The discharge switch is controlled by the vertical retrace pulse so that integration by the second integrating amplifier only occurs during each vertical scan of the monitor and begins over again with the next vertical scan, after the vertical retrace pulse. The output of the second integrating amplifier, an integrated vertical wave form 150, is supplied through a resistor 152 to the summing input terminal 126 of the summing amplifier 130.

A third integrating amplifier 154 receives a signal 156 from the microcontroller 40 reflecting one of the "static" signals 50 from a static contrast control (not shown) operated by the user. The signal 156 from the contrast control is provided through a resistor 160 to the third integrating amplifier. A second input terminal 162 of the third amplifier is connected to a voltage reference 164. An R-C feedback path 166 is provided for this third amplifier. The output of the third integrating amplifier is provided to the summing terminal 126 of the summing amplifier 130.

The summing amplifier 130 has a voltage reference 170 applied to a second input terminal 172. A resistor 174 in the feedback path of the summing amplifier determines the gain of the summing amplifier. The output of the summing amplifier is supplied to the video amplifiers 14 in the case of this contrast/white uniformity signal. Each of the integrating and summing amplifiers 112, 132, 154 and 130 may be an MC34082.

Similar, parallel circuitry exists for adjustment of the horizontal convergence, vertical convergence and focus. Specifically, the RAM 42, multiplexer 72, one-shot timer 82 and tri-state gate 70 exist for each of the other three signals as well. Further, the integrating and summing circuit 46 described above is duplicated for each of these three signals. However, the vertical-rate and static signals are different and correspond to the appropriate horizontal-rate signal. For example, the horizontal-rate horizontal convergence signal is summed with the vertical-rate horizontal convergence signal and with static horizontal convergence. Similarly, the horizontal-rate vertical convergence signal is summed with the vertical-rate vertical convergence signal and with the static vertical convergence signal. Similarly, the horizontal-rate focus signal is summed with the vertical-rate focus signal and summed with the static focus DC level signal. These summed signals are then supplied to the appropriate amplifiers.

It is understood, of course, that the integrator and summing circuit 46 contains similar circuitry without the horizontal (first) integrating amplifier 112 for the case of the numerous signals where only vertical rate correction is made.

When video and sync signals 24 (FIG. 1) are supplied to the monitor 8, the horizontal and vertical deflection amplifiers 20 and 22 receive the sync signals 32 and 34 from the video input amplifier 26 and generate horizontal and vertical retrace pulses 56 and 60 which are also supplied to the microcontroller 40 and the integrator and summing circuit 46. The microcontroller 40 also receives the sync signals from the video input amplifier 26 and can compare the sync and retrace signals to test the accuracy and operation of the deflection amplifiers. In the absence of a video signal, the microcontroller still supplies a raster to the CRT 12 by commanding the deflection amplifiers to operate at predetermined horizontal and vertical frequencies. The microcontroller supplies these commands to the deflection amplifiers in the same manner as the other signals via the data storage device 42, the PWM generator 52 and the integrator and summing circuit 46. Further, the microcontroller can perform diagnostic tests on the control circuit 36 and deflection amplifiers in this manner as well as adjust the frequencies.

It has been discovered that some of the display parameters have an interdependence between them. For example, if the horizontal or vertical size is changed the horizontal and vertical convergence will need a certain correction to keep the convergence properly adjusted. The required horizontal rate correction is a function of horizontal position on the tube surface, vertical position on the tube surface, horizontal frequency, and vertical frequency. The horizontal and vertical positions are more dominant than the frequencies.

The required correction is not symmetrical with respect to the tube surface so there is no simple equation. The monitor may be adjusted to a standard size and center and then aligned at M-by-N grid positions relative to the tube surface. This may be repeated at several frequencies. Then, multi-dimensional interpolation may be sued to generate the wave form for the given conditions of size, center and frequency. Since the groups are relative to the raster, as the user changes raster size or center, the groups move relative to the tube surface. Therefore, the correction for each group must be recomputed as a function of size and center. In this way, the system compensates as the user changes size and center. The interpolation is then a function of horizontal size adjustment, vertical size adjustment, horizontal center adjustment, vertical center adjustment, horizontal frequency, and vertical frequency.

Figure 6:
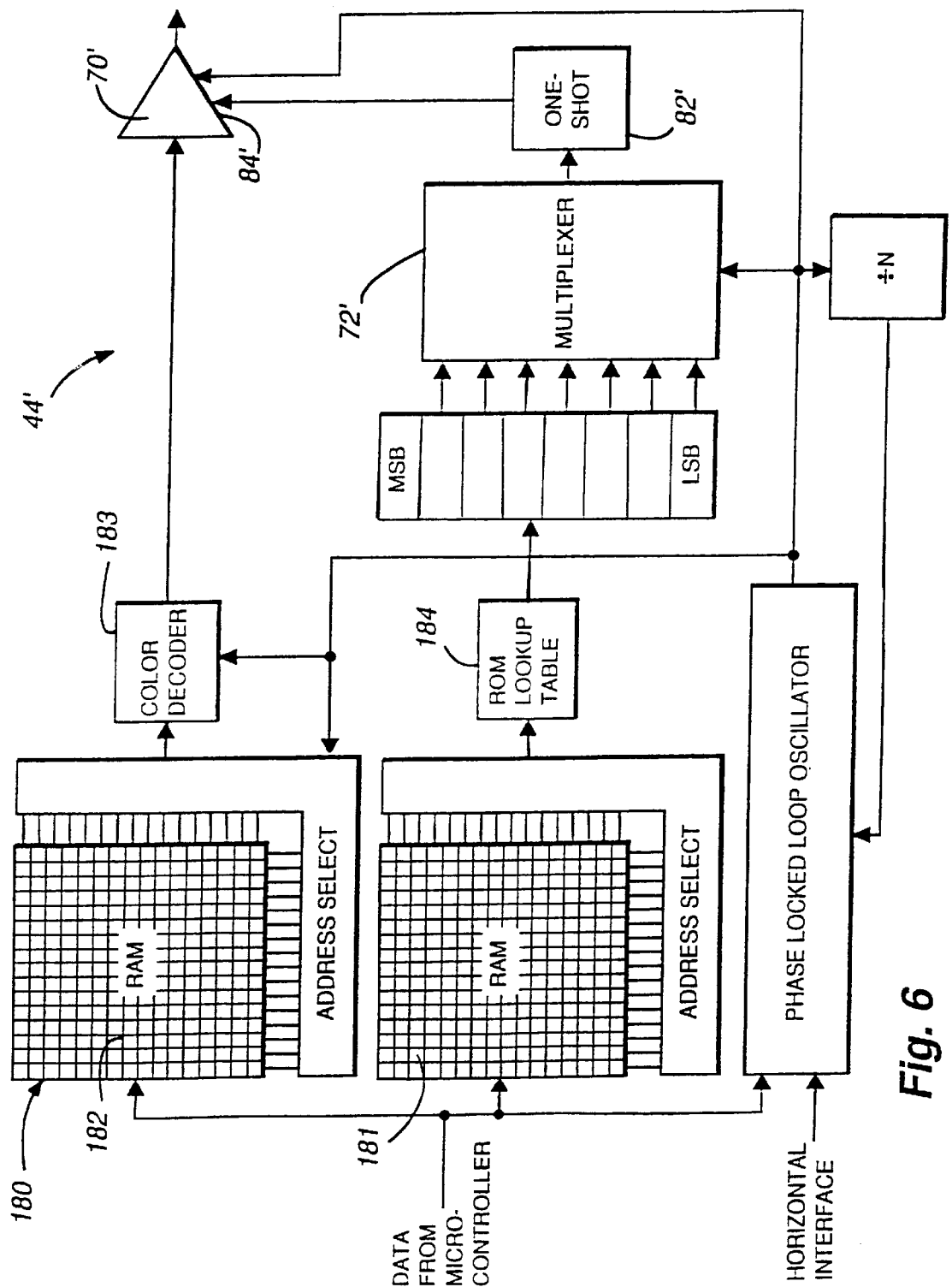
FIG. 6 is a second embodiment of the pulse density modulation generator and data storage device shown in FIG. 1.

The PDM generator 44' may alternatively be implemented in an SGS-Thompson XTV9421-1C, as seen in FIG. 6 (a prime designation is used). The SGS chip provides circuitry with some similarities to that shown in FIG. 2 with some significant differences. A three-dimensional RAM array 180 is provided, with a two-dimensional plane 181 of the array being dedicated to the data bits described previously. A second plane 182 relates to the "sign bits" corresponding to each byte in the first plane. This plane was originally used by SGS-Thompson to encode the colors corresponding to the information stored in the first plane. The present invention utilizes this "color" plane as follows. One "color" is encoded so as to always allow the data bits to be passed through the multiplexer 72' to the one-shot timer 82'. A second "color" is encoded with the "sign bits" for supplying same to the tri-state gate 70'. A third "color" is not used. A color decoder 183 is provided to decode the information relating to the three colors.

As before, the bytes in the first (data) plane contain eight bits. These bits are not the actual data, however. Instead each byte contains a seven-bit address to a ROM look-up-table 184 where each byte in the look-up table contains twelve bits of data. These twelve bits of data are supplied to the multiplexer 72' in a similar fashion as described above, with each of the twelve data bits being clocked through the one-shot timer 82' to the enable terminal 84' of the tri-state gate 70'.

Alternatively, the PDM signal 86 could be generated by a shift register (not shown) with an up or down pulse for each pixel in the display. Of course, such an approach would be either computationally intensive or require an inordinate amount of data storage.

A presently preferred embodiment of the present invention has been described above with a degree of specificity. It should be understood, however, that this degree of specificity is directed toward the preferred embodiment. For example the signal levels described above could be inverted or otherwise different, and/or the numbers of bytes, columns, rows, groups and bits per byte could be different. The invention itself, however, is defined by the scope of the appended claims.

The invention claimed is:

1. A method for generating a correction signal for altering predetermined display parameters for a plurality of segments on a video monitor comprising the steps of:

generating a pulse-width modulated signal for altering said predetermined display parameters during said plurality of segments, said pulse-width modulated signal having pulse-widths that are representative of a desired temporal rate of change of said correction signal during said plurality of segments:

performing an integration on said pulse-width modulated signal to produce an integrated signal that is representative of the integration of said pulse-width modulated signal with respect to time;

generating said correction signal from said integrated signal to alter said predetermined display parameters during said plurality of segments.

2. The method of claim 1 wherein said step of integrating said pulse-width modulated signal comprises generating a continuous integrated signal.

3. The method of claim 1 wherein said step of generating said pulse-width modulated signal comprises generating pulses that are in synchronization with a horizontal synchronization signal of said video monitor.

4. The method of claim 1 wherein said step of generating said pulse-width modulated signal comprises generating pulses that are in synchronization with a vertical synchronization signal of said video monitor.

5. The method of claim 1 wherein at least one of said predetermined display parameters comprises vertical luminosity.

6. The method of claim 1 wherein at least one of said predetermined display parameters comprises vertical shape.

7. The method of claim 1 wherein at least one of said predetermined display parameters comprises vertical convergence.

8. The method of claim 1 wherein at least one of said predetermined display parameters comprises vertical focus.

9. The method of claim 1 wherein at least one of said predetermined display parameters comprises horizontal centering.

10. The method of claim 1 wherein said predetermined display parameter comprises at least one of horizontal size.

11. A method of generating a correction signal to be applied to a display device for providing substantially aligned display parameters for a plurality of segments of a displayed image on said display device comprising the steps of:

generating a pulse-width modulated signal for said plurality of segments, said pulse-width modulated signal having a pulse-width that is representative of a desired temporal rate of change of said correction signal;

performing an integration on said pulse-width modulated signal to produce said correction signal that is representative of the integration of said pulse-width modulated signal with respect to time.

12. A device for generating a correction signal for altering a predetermined set of display characteristics for a plurality of segments on a cathode ray tube comprising:

a pulse-width modulation circuit that generates a plurality of pulse-width modulation signals for altering said predetermined set of display characteristics during said segments, said pulse-width modulation signal having pulse-widths that are representative of the rate of change of said correction signal during said segments;

an integrator coupled to said pulse-width modulation circuit that generates said correction signal that is the temporal integration of said pulse-width modulation signal.

13. An apparatus for generating a correction signal to be applied to a display device for altering display parameters for a plurality of segments on said display device comprising:

at least one pulse-width modulator that generates a plurality of pulse-width modulation signals for said plurality of segments, said pulse width modulation signals having pulse-widths that are representative of the rate of change of said correction signal;

at least one integrator coupled to said pulse-width modulator that generates an integrated signal from said pulse-width modulation that is representative of the integration of said pulse-width modulation signal;

at least one amplification circuit coupled to said integrator that generates said corrected signal that is applied to said display device.

14. The apparatus of claim 13 further comprising:

a summing circuit coupled to an input of said at least one amplification circuit for summing a plurality of integrated signals from a plurality of said integrators to produce a summed signal that is applied to said amplification circuit.

15. The apparatus of claim 13 wherein said at least one amplification circuit comprises a horizontal deflection amplifier.

16. The apparatus of claim 13 wherein said at least one amplification circuit comprises a vertical deflection amplifier.

17. The apparatus of claim 13 wherein said at least one amplification circuit comprises a video output amplifier.

* * * * *